G. J. OESTREICHER.
GROUND GRIPPING DEVICE FOR VEHICLE WHEELS.
APPLICATION FILED OCT. 21, 1921.
1,404,312. Patented Jan. 24, 1922.
3 SHEETS—SHEET 3.
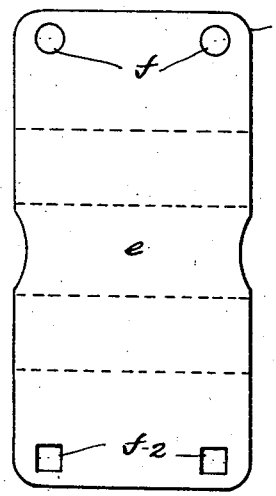
Fig. 10
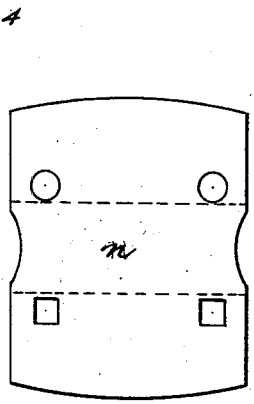
Fig. 13
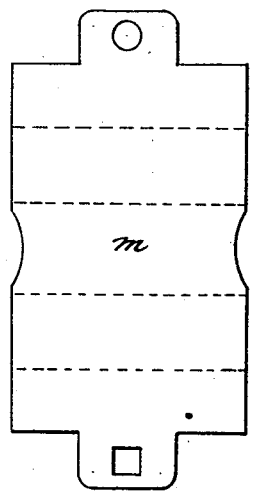
Fig. 15
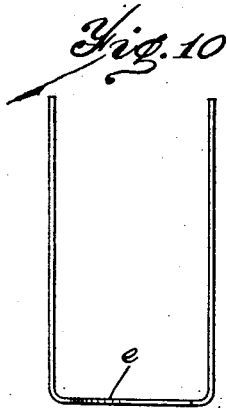
Fig. 11
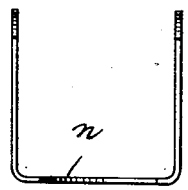
Fig. 14
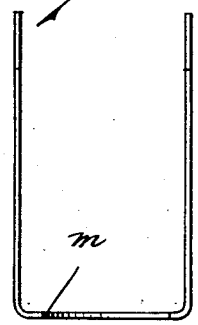
Fig. 16
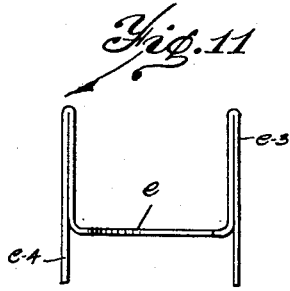
Fig. 12
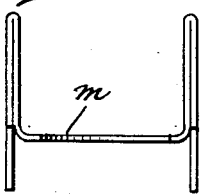
Fig. 17
Inventor
George J. Oestreicher
By Ralph J. Burton
Attorney

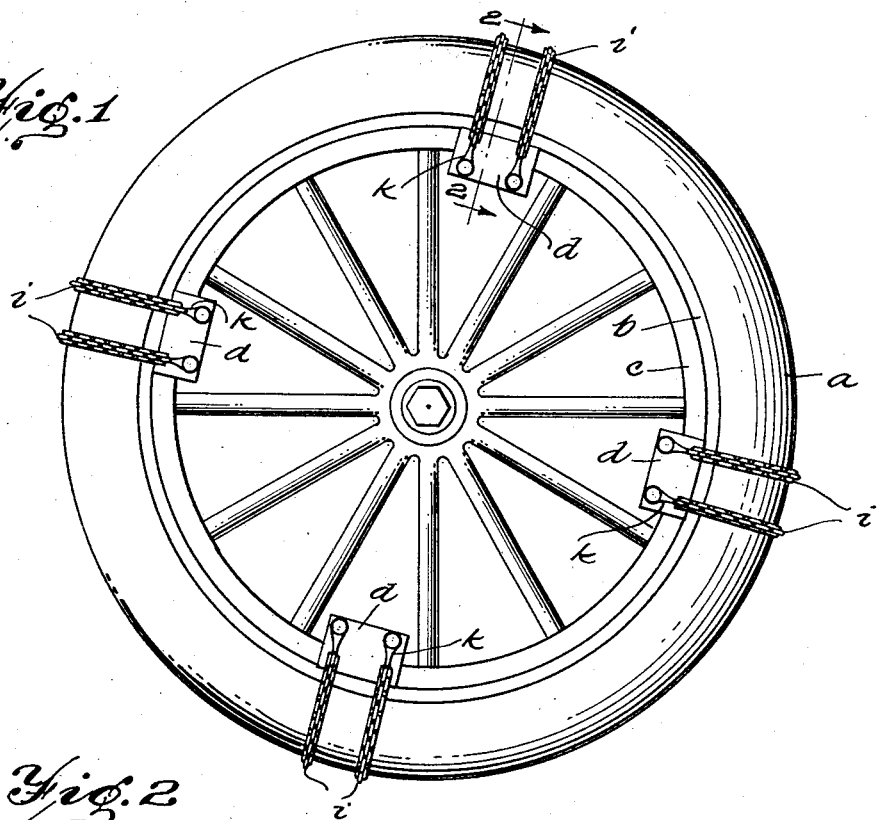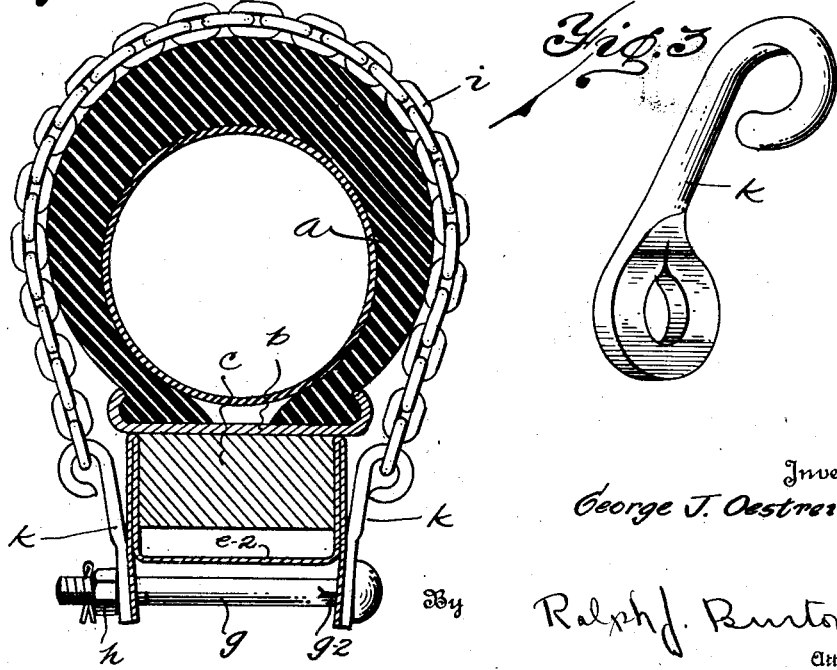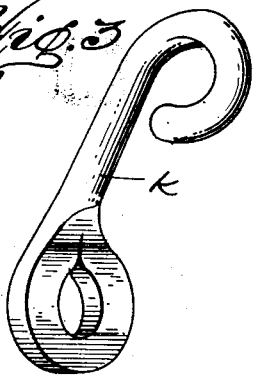

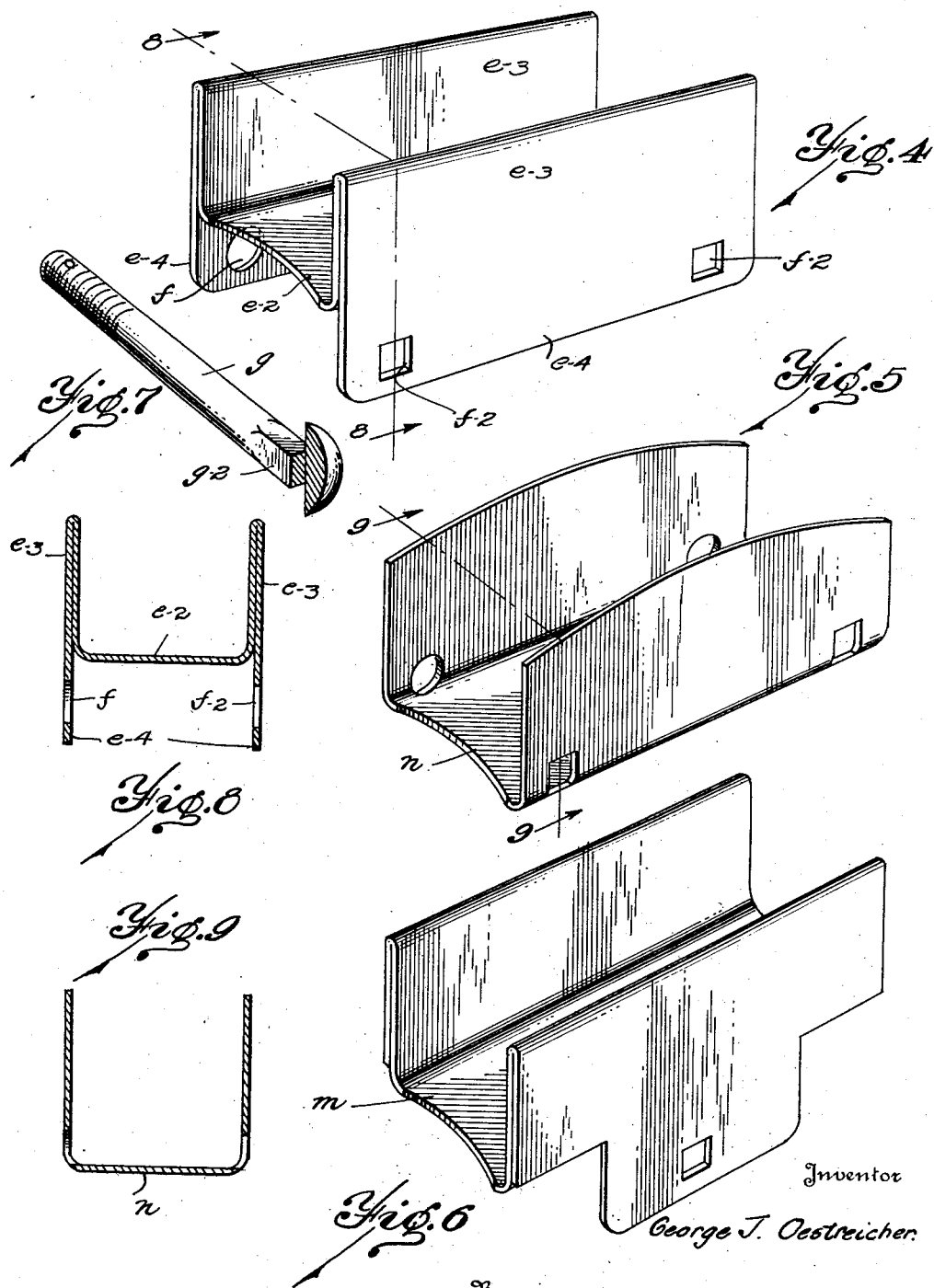

UNITED STATES PATENT OFFICE.

GEORGE J. OESTREICHER, OF WEST PARK, OHIO, ASSIGNOR OF ONE-HALF TO JOSEPH FLACHBART, SR., OF CLEVELAND, OHIO.

GROUND-GRIPPING DEVICE FOR VEHICLE WHEELS.

1,404,312.   Specification of Letters Patent.   Patented Jan. 24, 1922.

Application filed October 21, 1921. Serial No. 509,288.

*To all whom it may concern:*

Be it known that I, GEORGE J. OESTREICHER, a citizen of the United States, residing at West Park, in the county of Cuyahoga and State of Ohio, have invented certain new and useful Improvements in Ground-Gripping Devices for Vehicle Wheels, of which the following is a specification.

My invention relates to improvements in ground gripping devices for vehicle wheels, and particularly to a simple, inexpensive, easily attachable anti-skid device adapted for use on motor vehicle wheels.

My invention comprises a saddle member adapted to be received over the felly of the wheel, embracing the same and seating against the metal rim and provided with transversely extending tire chains extending across the tread of the wheel, and secured at opposite ends to opposite sides of the saddle by releasable means, through the use of which the chains may be tightened in place across the tread.

The saddle member is preferably formed of an integral metal blank as shown and hereinafter described, having side flanges particularly rigid where they embrace the felly, but of such flexibility where the tread chains are secured thereto as to yield inwardly toward each other when the chains are drawn tightly across the tread, so that the chains will be held snugly and securely across the tread against any rattle or play. Easily releasable means are provided for tightening the chains in position by means of which the chains may be quickly released and replaced by new chains in case of breakage.

The chains are provided at the ends with peculiarly shaped securing links which are engaged by the tightening means to secure the tread chains to the saddle, and which are so shaped as to aid in tightening the chains in place.

The above and other objects will more fully appear from the following description, appended claims and accompanying drawings, in which:

Fig. 1 is a side elevation of a pneumatic tread vehicle wheel, showing my device in place thereon.

Fig. 2 is a cross section taken on line 2—2 of Fig. 1.

Fig. 3 is a perspective of one of the end links.

Fig. 4 is a perspective of a saddle member.

Fig. 5 is a perspective of a modified form of saddle member.

Fig. 6 is a perspective of another modified form of saddle member.

Fig. 7 is a perspective of one of the bolts, partly broken away.

Fig. 8 is a cross section taken on line 8—8 of Fig. 4.

Fig. 9 is a cross section taken on line 9—9 of Fig. 5.

Fig. 10 is an integral metal blank such as used to form the saddle member shown in perspective in Fig. 4, the various steps in the formation of which are shown in Figs. 11 and 12.

Fig. 13 is an integral metal blank such as used to form the saddle member shown in perspective in Fig. 5, the next step in the formation of which is shown in Fig. 14.

Fig. 15 is an integral metal blank such as used to form the saddle member shown in perspective in Fig. 6, the succeeding steps in the formation of which are shown in Figs. 16 and 17.

It is obvious that within the scope of the invention, the devices may be constructed in the various forms shown in the drawings, either with one or two tread chains, or such number as might be desired. Such number of the devices might be used on a wheel as seems desirable. In Fig. 1 of the drawings, four of the devices are shown as secured to the wheel arranged ninety degrees apart thereon. In this figure of the drawing, the tread of the wheel is indicated as $a$, the metal rim as $b$, the felly as $c$, and the device in assembly as $d$.

My device as illustrated in Figure 1 of the drawing, comprises a saddle portion, which has preferably been formed from an integral metal blank $e$ as illustrated in the views 10, 11 and 12, showing the various steps in the operation of shaping the blank $e$ into a saddle member such as shown in perspective in Fig. 4, in which $e^2$ indicates the transversely extending web portion, and the doubled over portions of the sides, which abut the sides of the felly, are indicated as $e^3$, and the inwardly extending flexible portions of the sides are indicated as $e^4$. This saddle portion is adapted to be received over the felly, as shown in Fig. 2, opposite sides of which seat upon the steel rim $b$, and hold the saddle in spaced relationship from the inside of the felly.

The resilient side portions $e^4$ which extend inwardly of the web toward the axis of the wheel with the device in place thereon, are perforated as at $f$, to provide a passageway for bolts $g$. One of the side members is shown as provided with squared perforations $f^2$, in order that when the nut $h$ is tightened on the bolt $g$, the bolt will be held securely against rotation, the bolt being squared as at $g^2$ adjacent the head so as to be held securely within the perforations $f^2$.

Transversely extending tire chains $i$ are provided which extend across the tread of the wheel and are adapted to be releasably secured to opposite sides of the saddle through the use of curved eye links $k$, secured to opposite ends of the chains. The tightening bolts $g$ extend through the eyes of the links $k$ and in the tightening of the nuts on the bolts, the links rock slightly on the sides of the saddle and the flexible portions of the saddle side walls yield inwardly toward each other so that the chain is stretched taut across the tread of the tire.

Owing to the seating of the saddle sides upon the rim rather than upon the wood felly, the tightening of the chains does not bind across the inside of the felly so as to mar the same, and the inwardly extending portion of the side walls possessing flexibility permits such walls to yield inwardly toward each other to permit tightening of the chains across the tread.

It is obvious that the saddle member need not of necessity be constructed of an integral metal blank, but the form of construction shown is that which is thought to possess advantages and is simple and inexpensive to construct, and possesses great durability.

The saddle construction shown in Figs. 6 and 7 is similar except that it is intended for use with one cross tread chain, and is constructed from a metal blank $m$ as shown in Fig. 15, the forming operation being further illustrated in Figs. 16 and 17.

Figs. 5 and 9 illustrate yet another modification, which is constructed from a metal blank $n$ formed as shown in Fig. 13, the sides of which are turned up as shown in Fig. 14. The sides are rounded as shown in the drawing to fit snugly within the circumference of the rim, and are perforated close under the web portion, which web portion would be spaced from the inner side of the felly as previously shown and described in referring to saddle $e$.

This device in operation may be used as an anti-skid device for vehicle wheels, for which purpose it is principally intended, or it might be used in case of soft roadways where it is desirable to secure a greater traction. It is of a particularly strong and sturdy construction and is thought to be peculiarly adapted for use on trucks.

What I claim is:

1. In a ground gripping device for vehicle wheels, in combination with a saddle formed of an integral metal blank shaped so as to embrace the felly and seat against the rim of the wheel and having each side bent back upon itself extending beyond the web portion interiorly of the wheel, tightening bolts extending through said interiorly projecting ends of the bent back sides, tread chains opposite ends of which are secured to opposite ends of said tightening bolts so as to be drawn snugly across the tread of the wheel.

2. In a ground gripping device for vehicle wheels, a felly embracing portion comprising a saddle formed of an integral metal blank shaped so as to embrace the felly of the wheel resting on the rim thereof and having each side bent back upon itself, transversely extending tread chains extending across the tread of the wheel secured at opposite ends to the bent back sides of the saddle, means for tightening said chains.

3. In a device of the class described, in combination, a saddle portion formed from an integral metal blank shaped so as to fit over the felly of a wheel and rest on the rim thereof and having each side bent back upon itself, tire chains extending transversely across the tread of the wheel and releasably secured at opposite ends to opposite sides of said saddle portion.

4. In a ground gripping device for vehicle wheels, in combination, a saddle portion shaped to embrace the felly of the wheel opposite sides of which rest upon the rim so that the transversely extending web portion is spaced from the felly, said saddle provided with resilient side flanges projecting inwardly of the wheel beyond said transversely extending web, tire chains adapted to extend across the tread of the wheel, means for releasably securing opposite ends of said chains to opposite resilient side flanges of the saddle and for adjustably drawing said flanges toward each other.

GEORGE J. OESTREICHER.